Patented June 21, 1932

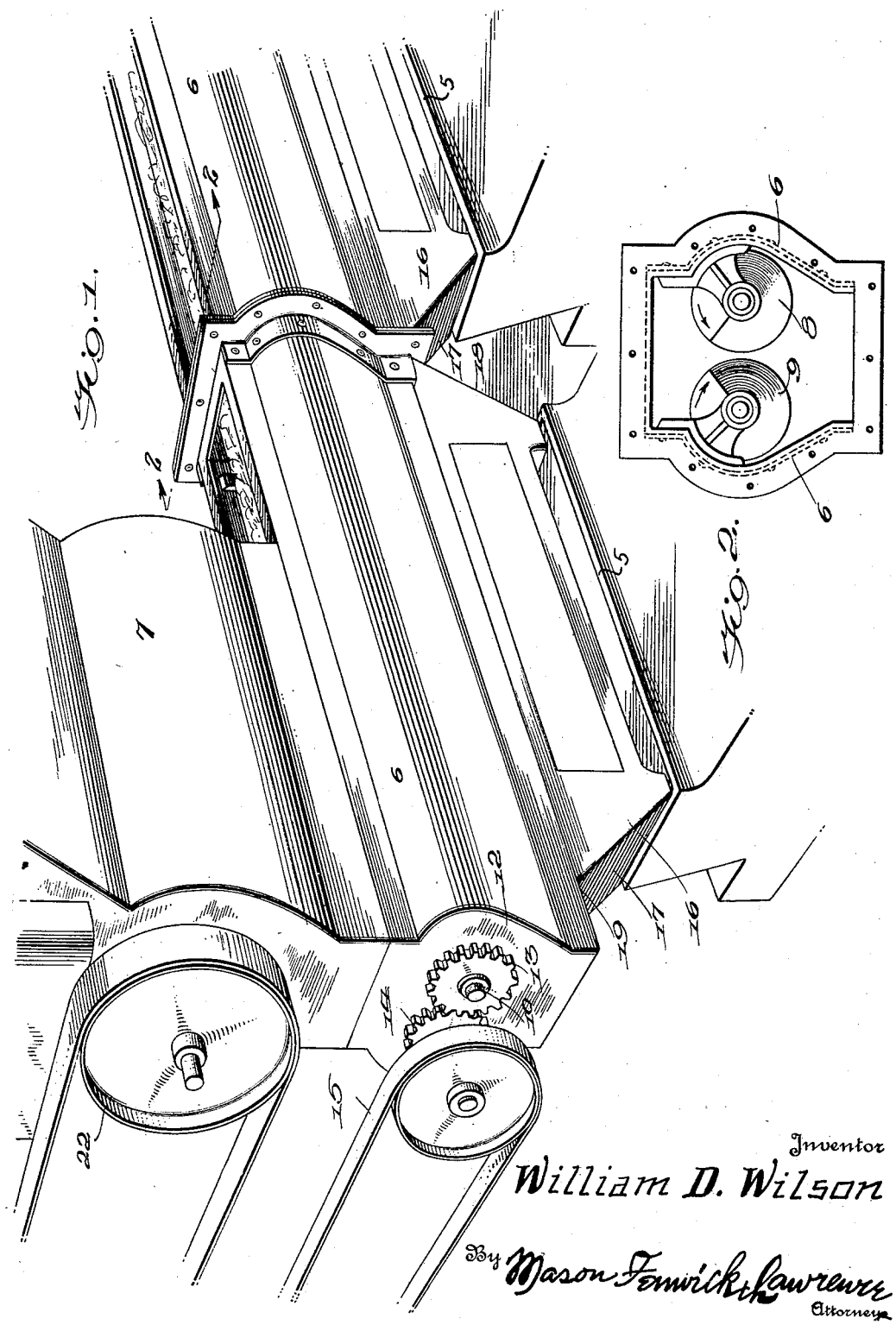

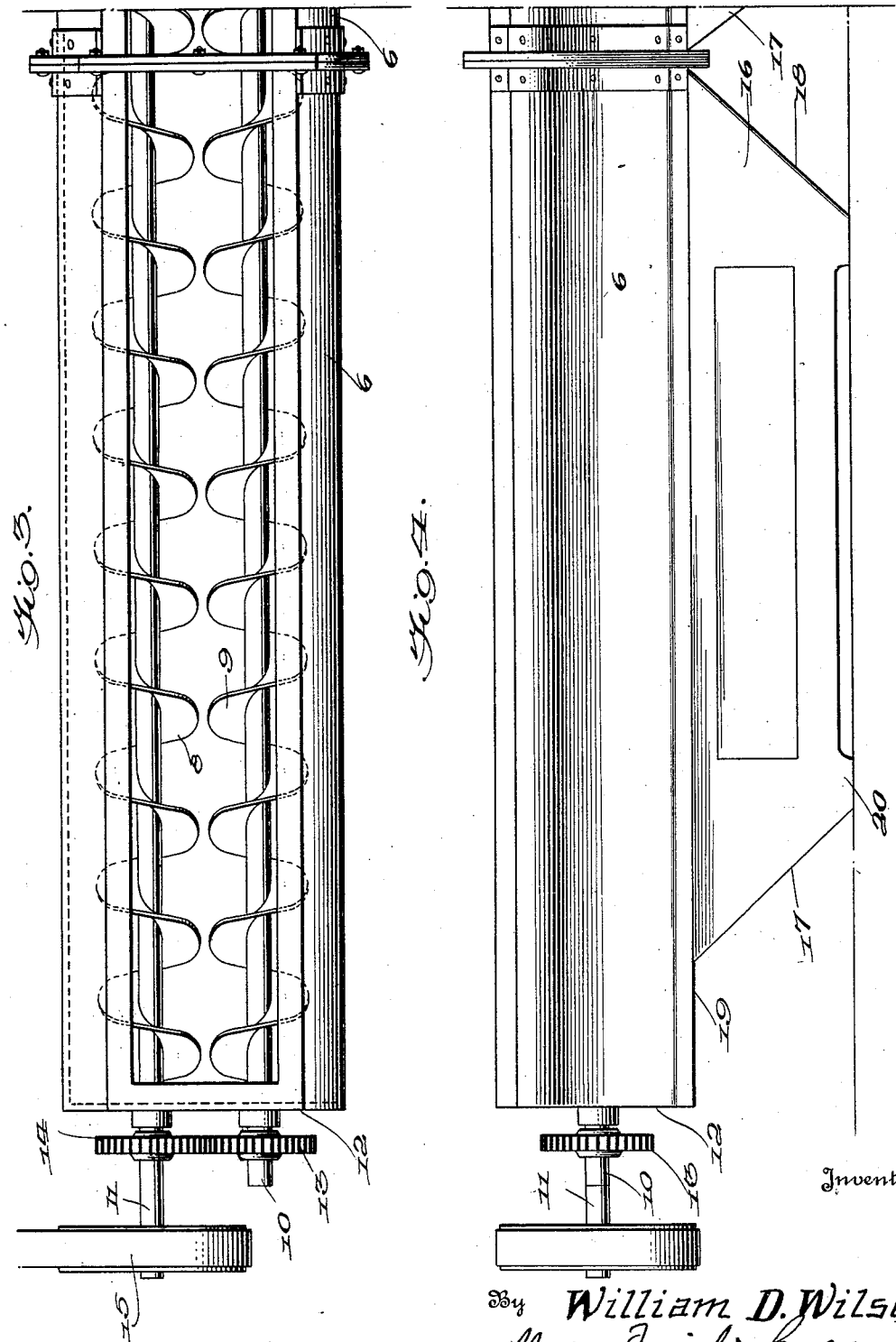

1,864,388

UNITED STATES PATENT OFFICE

WILLIAM DORSETT WILSON, OF MEMPHIS, TENNESSEE

DISTRIBUTOR FOR COTTON GINS

Application filed July 3, 1930. Serial No. 465,736.

This invention relates to improvements in distributors for cotton gins; and more particularly, to conveyors which not only distribute the cotton, but feed the same into a plurality of gins located beneath the same.

The prime object of the invention is to distribute the cotton into a plurality of gins positioned below the conveyor, and at the same time, feed the cotton into the gins.

Hereofore, endless belts with spikes as shown in the patent to Munger, No. 478,883 have been used, or a single screw conveyor. The use of these two devices for distributing the cotton are open to many objections, the principal one being that there is an unequal distribution of the cotton in the gin, and many times the cotton collects along the upper edges, or in dead spots without actually getting into the gin proper. By using two single flight conveyors of the screw type, rotating toward each other, not only is the cotton equally distributed among the gins, but is actually fed into the troughs or hoppers of the gins.

Another object is to eliminate the dead spaces between the gins, so that there will be no lost cotton.

Other objects will be disclosed in the specification and claims forming a part of this application.

In the drawings:

Figure 1 is a perspective of the conveyor means in assembled relation to the gins and the means for propelling the conveyor means.

Figure 2 is a section taken on line 2—2 of Figure 1;

Figure 3 is a top plan of the conveyors in assembled relation; and

Figure 4 is a side elevation of the structure shown in Figure 3.

Referring to the drawings in which like parts are designated with similar numerals:

Numeral 5 designates a plurality of gins arranged in a single line or range. Upon these gins 5 is placed a continuous casing 6, at one end of which is a hopper, 7, of the usual construction and does not form a part of this invention. Within the casing 6 are positioned two single flight conveyors 8 and 9 of the screw type. Stub shafts 10 and 11 extend from said conveyors 8 and 9, respectively, through the end wall 12 of the casing 6. Mounted on the stub shafts 10 and 11 are meshed gears 13 and 14. A power drive 15 is mounted on the stub shaft 11 to rotate the same. The opposite ends, not shown, of the conveyors 8 and 9, are supported in any suitable manner in brackets, not shown.

Funnel shaped troughs extend from the bottom of the casing 6 and direct the cotton into the gins 5. These troughs form storage chambers for cotton to be operated upon by the gins. The sides 17 and 18 of the troughs 16 slope inwardly from the top edges 19, the top edges 19 of the troughs 16 being closely adjacent to each other in end to end relation. Thus no dead spots are present in the conveyor casing 6. The bottom portion 20 of the troughs 16 are adapted to fit into the gins to feed the cotton therein. A feeder of the usual construction is mounted in the hopper 7 and operated by a power drive 22.

As actually operated, the cotton is fed through the hopper 7 in the usual manner and into the conveyor casing 6. Since the drive 15 is on stub shaft 11, the gear 14 will be driven in a clockwise direction, and since gear 13 is in mesh with gear 14, gear 14 will be revolved in a counter-clockwise direction. These gears in turn cause the conveyors 8 and 9 to revolve in the same direction as their respective gears, which will be toward each other. As the cotton is fed forward by means of the conveyors, a very positive feed is established which not only feeds the cotton in the desired direction over the gins, but will throw the cotton downwardly into the troughs 16. This results in more rapid distribution, the hoppers being filled at the same time, and most important of all, actually feeds the cotton into the hopper due to the two conveyors 8 and 9 revolving toward each other and feeding in a downward direction which is not present where a single conveyor is used or an endless belt conveyor.

No other conveyor distributes the cotton with the certainty, speed and uniformity that is attained by my double screw. The screws may be driven at a higher rate of speed, and screws of smaller diameter may be used than would be possible with a single screw element. The space between the screws permits the cotton to be carried both downwardly and forwardly with greater freedom than would be possible with a single screw, since both walls of the intervening space are moving and there is no tendency for the cotton to clog or bind. Moreover, with my conveyor the cotton is carried down into the middle of the receiving trough and not to one side of the trough where it would tend to collect, heaping up on that side and leaving the other side partially empty.

The capacity of the elevator which feeds cotton to the hopper 7 exceeds the combined capacities of the gins and of the troughs 16 in which the cotton is stored for the individual gins. The first trough is, therefore, rapidly filled and, the cotton therein forms in effect a bottom for the conveyor casing. The main body of the cotton is then carried on to the next trough, which, in turn is filled and the remaining cotton is carried on and deposited in the same manner until the last trough has been filled. After this, the surplus cotton drops to the floor or into a suitable receptacle from which it is returned to hopper 7 in the usual manner. After the troughs are filled the process continues, the cotton being removed from the troughs as the gins operate and the troughs being replenished from the conveyor.

Again, by having the troughs 16 meet at the top and slope inwardly so that the discharge end 20 will fit the gins 5, no dead space is present in the conveyor casing 6, which is the case in construction at the present time.

What I claim is:

1. A cotton ginning and distributing apparatus comprising in combination, a battery of gins, a casing extending across said gins and open at the bottom above the gins, and a conveyor and feeder within said casing comprising a pair of screw elements, the adjacent sides of the said elements revolving downwardly.

2. A cotton ginning and distributing apparatus comprising, in combination, a battery of gins, a casing extending across said gins and open at the bottom above the gins, a conveyor and feeder within said casing comprising a pair of screw elements, the adjacent sides of which revolve downwardly, and a feed hopper above one end of the conveyor and communicating therewith.

3. In a distributing apparatus of the character described, the combination of a substantially horizontal trough having a longitudinal discharge opening through the bottom thereof, and a conveyor and feeder within the trough comprising right and left rotating screw elements, the adjacent sides of which revolve downwardly toward the said opening.

In testimony whereof I affix my signature.

WILLIAM DORSETT WILSON.